US011968125B2

(12) United States Patent
Zu et al.

(10) Patent No.: US 11,968,125 B2
(45) Date of Patent: Apr. 23, 2024

(54) DATA TRANSMISSION METHOD AND APPARATUS

(71) Applicant: CHINA UNIONPAY CO., LTD., Shanghai (CN)

(72) Inventors: Lijun Zu, Shanghai (CN); Hang Yuan, Shanghai (CN); Jintan Wu, Shanghai (CN); Hongmei Chu, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/919,209

(22) PCT Filed: Nov. 5, 2021

(86) PCT No.: PCT/CN2021/128863
§ 371 (c)(1),
(2) Date: Oct. 14, 2022

(87) PCT Pub. No.: WO2022/166286
PCT Pub. Date: Aug. 11, 2022

(65) Prior Publication Data
US 2023/0179528 A1    Jun. 8, 2023

(30) Foreign Application Priority Data

Feb. 7, 2021 (CN) .................... 202110169219.4

(51) Int. Cl.
*H04J 3/14* (2006.01)
*H04L 9/40* (2022.01)
(Continued)

(52) U.S. Cl.
CPC .......... *H04L 47/24* (2013.01); *H04L 63/0876* (2013.01); *H04L 69/22* (2013.01)

(58) Field of Classification Search
CPC ..... H04L 47/24; H04L 63/0876; H04L 69/22; H04L 47/2491; H04W 28/0268
(Continued)

(56) References Cited

U.S. PATENT DOCUMENTS 11,431,781 B1* 8/2022 Carofiglio ............ H04N 21/632
11,743,758 B2* 8/2023 Liu ..................... H04L 43/0852
370/235
(Continued)

FOREIGN PATENT DOCUMENTS

CN      101340387 A    1/2009
CN      101510846 A    8/2009
(Continued)

OTHER PUBLICATIONS

The World Intellectual Property Organization (WIPO) International Search Report for PCT/CN2021/128863 dated Jan. 29, 2022 6 pages (including translation).
(Continued)

*Primary Examiner* — Chuong T Ho
(74) *Attorney, Agent, or Firm* — ANOVA LAW GROUP, PLLC

(57) ABSTRACT

A data transmission method includes: determining, by a regional access device, a message that needs to be transmitted includes M pieces of QoS information; and after the regional access device determines that a device identifier in a first piece of QoS information is consistent with a device identifier of the regional access device, updating a QoS value of the message that needs to be transmitted with a first QoS value in the first piece of QoS information, and forwarding the updated message that needs to be transmitted. The first piece of QoS information is any one of the M pieces of QoS information.

18 Claims, 8 Drawing Sheets

(51) Int. Cl.
*H04L 47/24* (2022.01)
*H04L 69/22* (2022.01)

(58) Field of Classification Search
USPC .......................................... 370/235
See application file for complete search history.

(56) References Cited

U.S. PATENT DOCUMENTS

| | | | |
|---|---|---|---|
| 2006/0039381 A1 | 2/2006 | Anschutz et al. | |
| 2019/0327642 A1* | 10/2019 | Peng | H04W 28/08 |
| 2021/0007118 A1* | 1/2021 | Liu | H04W 72/1263 |
| 2021/0212069 A1* | 7/2021 | Moon | H04W 72/56 |
| 2021/0297894 A1* | 9/2021 | Liu | H04W 28/0268 |
| 2021/0306275 A1* | 9/2021 | Ke | H04L 63/0485 |
| 2022/0046529 A1* | 2/2022 | Boerjesson | H04W 36/14 |
| 2022/0053364 A1* | 2/2022 | Kim | H04W 28/24 |
| 2022/0232445 A1* | 7/2022 | Shu | H04W 36/30 |
| 2022/0255828 A1* | 8/2022 | Li | H04L 47/22 |
| 2022/0322135 A1* | 10/2022 | Xu | H04W 28/0268 |
| 2023/0051269 A1* | 2/2023 | Liu | H04W 24/10 |
| 2023/0171645 A1* | 6/2023 | Wang | H04W 28/0967 |
| | | | 455/11.1 |
| 2023/0261826 A1* | 8/2023 | Li | H04L 5/0048 |
| | | | 370/329 |
| 2023/0269036 A1* | 8/2023 | Fan | H04L 1/1854 |
| | | | 370/329 |

FOREIGN PATENT DOCUMENTS

| | | |
|---|---|---|
| CN | 104052741 A | 9/2014 |
| CN | 105207787 A | 12/2015 |
| CN | 109451534 A | 3/2019 |
| CN | 110535782 A | 12/2019 |
| CN | 111541612 A | 8/2020 |
| CN | 112040513 A | 12/2020 |
| CN | 112995062 A | 6/2021 |
| WO | 2020119564 A1 | 6/2020 |

OTHER PUBLICATIONS

Xiao-Ian Liu et al., QoS Management and Next Generation Protocol's Support for It, Computer Engineering and Design, 2005, pp. 1051-1055, vol. 26 No. 4, 706 Institute of the Second Research Institute of China Aerospace Science and Industry Corporation, Beijing, China.

* cited by examiner

| Ver | Traffic class | Flow label | |
|---|---|---|---|
| Payload length | | Next header | Hop limit |
| Source IP | | | |
| Destination IP | | | |
| SourceIP=SourceIP in the basic header | Flag=1 | Qos=Traffic class in the basic header | |
| DeviceIP of first QoS update | Flag=0 | Qos=First updated QoS value | |
| DeviceIP of second QoS update | Flag=0 | Qos=Second updated QoS value | |
| ... | Flag=0 | ... | |

FIG. 6

DATA TRANSMISSION METHOD AND APPARATUS

CROSS-REFERENCE TO RELATED APPLICATION

This application is a national phase entry under 35 U.S.C § 371 of International Patent Application No. PCT/CN2021/128863, filed on Nov. 5, 2021, which claims priority to Chinese Patent Application No. 202110169219.4, filed on Feb. 7, 2021, the entire contents of all of which are incorporated herein by reference.

TECHNICAL FIELD

The present disclosure relates to the technical field of communication technologies and, more particularly, to a method and an apparatus of data transmission.

BACKGROUND

When a data message is transmitted in a network, the data message often traverses a plurality of areas. Different areas include different network devices, have different circuit bandwidths, and carry different services. Thus, when the data message traverses different network areas, different quality of service (QoS) values need to be configured according to actual conditions in the different network areas to assign suitable network resources to ensure a smooth transmission of the data message within each of the different network areas.

At this stage, because the QoS value of the data message corresponding to a border network device in each area is different, when the data message is transmitted through different network areas, it is necessary to incorporate configuration of the border network device in each area to modify the QoS value of the data message, thereby ensuring the smooth transmission of the data message as the data message traverses the different network areas. However, because this processing method needs to modify the QoS value of the data message by incorporating the configuration of the border network device in each area, it will cause an increase in a workload of modifying the QoS value of the data message, and will lead to an inefficiency in modifying the QoS value of the data message.

As such, there is an urgent need for a data transmission method for an automatic update of the QoS value in different network areas.

SUMMARY

The present disclosure provides a data transmission method and a data transmission apparatus to automatically update a QoS value in different network areas.

One aspect of the present disclosure provides a data transmission method. The method includes: determining, by a regional access device, whether a message that needs to be transmitted includes M pieces of QoS information, where the M pieces of QoS information are generated according to QoS values set by each regional access device for the message that needs to be transmitted, and M is an integer greater than 1; and after the regional access device determines that a device identifier in a first piece of QoS information is consistent with a device identifier of the regional access device, updating a QoS value of the message that needs to be transmitted with a first QoS value in the first piece of QoS information, and forwarding the updated message that needs to be transmitted, where the first piece of QoS information is any one of the M pieces of QoS information.

In the embodiments of the present disclosure, the regional access device determines the message that needs to be transmitted contains M pieces of QoS information (i.e., service quality QoS information). When it is determined that the device identifier in the first piece of QoS information is consistent with the device identifier of the regional access device, the QoS value of the message that needs to be transmitted is updated to the first QoS value in the first piece of QoS information, and the updated message that needs to be transmitted is forwarded. The M pieces of QoS information are generated according to the QoS values set by the regional access devices in each area for the message that needs to be transmitted. The first piece of QoS information is any one of the M pieces of QoS information. By adding corresponding configuration to the message that needs to be transmitted, that is, inserting the M pieces of QoS information into the message that needs to be transmitted, the QoS value in different network regions can be updated without adding any configuration to the regional access device. Thus, the QoS value in different network areas can be automatically updated, and the workload brought by modifying the QoS value in different network areas can be reduced, thereby facilitating convenience of maintenance.

In some embodiments, determining whether the message that needs to be transmitted includes the M pieces of QoS information includes: determining, by the regional access device, the message that needs to be transmitted includes the M pieces of QoS information when a preset field in a basic header of the message that needs to be transmitted includes a set identifier, wherein the M pieces of QoS information are located in an extension header of the message that needs to be transmitted.

In the above technical solution, through setting a set identifier in the preset field in the basic header of the message that needs to be transmitted, the regional access device receives the message that needs to be transmitted and determines whether the message that needs to be transmitted contains the M pieces of QoS information. Thus, the regional access device is able to provide appropriate network transmission resources timely and accurately for the message that needs to be transmitted based on the M pieces of QoS information.

In some embodiments, the M pieces of QoS information are set according to an order of regional access devices that the message that needs to be transmitted traverses in series in a process of transmitting the message, and each piece of QoS information includes a device identifier of the corresponding regional access device and a QoS value set by the corresponding regional access device.

In the above technical solution, through setting the M pieces of QoS information according to an order of the regional access device in each area that the message that needs to be transmitted traverses in series during the transmission process, in the process of transmitting the message that needs to be transmitted, the traversed regional access devices can timely and accurately match the corresponding QoS information, and can update the QoS value in the message that needs to be transmitted based on the corresponding QoS information. As such, each regional access device can provide appropriate network transmission resources to transmit the message that needs to be transmitted timely and accurately based on the updated QoS value in the message that needs to be transmitted.

In some embodiments, determining that the device identifier in the first piece of QoS information is consistent with the device identifier of the regional access device includes: determining, by the regional access device, the first piece of QoS information located in the extension header of the message that needs to be transmitted; and determining, by the regional access device, that the device identifier in the first piece of QoS information is consistent with the device identifier of the regional access device.

In some embodiments, after updating the QoS value of the message that needs to be transmitted to the first QoS value in the first piece of QoS information, the method further includes: deleting, by the regional access device, the first piece of QoS information from the extension header.

In the above technical solution, after the regional access device receives the message that needs to be transmitted, the regional access device determines whether the device identifier in the first piece of QoS information is consistent with the device identifier of the regional access device. As such, the regional access device can determine whether the QoS value of the message that needs to be transmitted needs to be updated. Thus, the regional access device can timely and accurately determine what network transmission resources to provide for the message that needs to be transmitted, thereby ensuring a smooth transmission of the message that needs to be transmitted. In addition, after the QoS value of the message that needs to be transmitted is updated to the first QoS value in the first piece of QoS information, the first piece of QoS information is deleted from the extension header. As such, the regional access device that receives the message that needs to be transmitted can accurately match the piece of QoS information corresponding to itself, thereby facilitating the regional access device to provide appropriate network transmission resources to ensure the smooth transmission of the message that needs to be transmitted.

In some embodiments, before updating the QoS value of the message that needs to be transmitted to the first QoS value in the first piece of QoS information, the method further includes: setting a validity flag bit in the first piece of QoS information to valid, wherein deleting, by the regional access device, the first piece of QoS information from the extension header includes deleting, by the regional access device, the piece of QoS information having the validity flag bit set to valid from the extension header.

In the above technical solution, through setting the validity flag bit in the first piece of QoS information to valid, the regional access device can determine whether first piece of QoS information in the basic header of the message that needs to be transmitted is valid, accurate, and available. At the same time, the regional access device can accurately recognize the first QoS value in the first piece of QoS information in the basic header of the message that needs to be transmitted, and provide appropriate network transmission resources timely and accurately for the message that needs to be transmitted based on the first QoS value.

Another aspect of the present disclosure provides a data transmission method. The data transmission method incudes: generating, by a service device, a message that needs to be transmitted, wherein the message that needs to be transmitted includes M pieces of QoS information, the M pieces of QoS information are generated according to a QoS value set for the message that needs to be transmitted by a regional access device in each network area, and M is an integer greater than 1; and transmitting, by the service device, the message that needs to be transmitted.

In the above technical solution, through generating the message that needs to be transmitted containing the M pieces of QoS information and transmitting the message that needs to be transmitted, the regional access device that receives the message that needs to be transmitted can determine whether the message that needs to be transmitted contains the M pieces of QoS information. If the regional access device determines that the message that needs to be transmitted contains the M pieces of QoS information, and determines the device identifier in the first piece of QoS information is consistent with the device identifier of the regional access device, the regional access device can update the QoS value of the message that needs to be transmitted to the first QoS value in the first piece of QoS information and forward the updated message that needs to be transmitted. As such, the through adding corresponding configuration in the message that needs to be transmitted, that is, inserting the M pieces of QoS information in the message that needs to be transmitted, the QoS value can be updated in different network areas without adding any configuration in the regional access device. Thus, the QoS value in different network areas can be automatically updated.

In some embodiments, generating, by the service device, the message that needs to be transmitted includes: generating, by the service device, an initial message that needs to be transmitted; determining, by the service device, a message modification rule for the initial message according to a service type of the initial message, wherein each message modification rule corresponds to at least one piece of QoS information; and adding, by the service device, the M pieces of QoS information into an extension header of the initial message according to the message modification rule, and setting a set identifier in a preset field in a basic header of the initial message to obtain the message that needs to be transmitted.

In the above technical solution, the message modification rule is determined for the initial message based on the service type of the initial message. The M pieces of QoS information are added to the extension header of the initial message based on the message modification rule. The set identifier is set in the preset field in the basic header of the initial message. As such, the regional access device that receives the message that needs to be transmitted can determine whether the message that needs to be transmitted contains the M pieces of QoS information based on the set identifier. Thus, the regional access device can timely and accurately provide appropriate network transmission resources for the message that needs to be transmitted based on the M pieces of QoS information.

In some embodiments, the message modification rule is generated by a control terminal based on the service type set by the service device, messages of a same service type are transmitted through a same regional access device, and the same regional access device sets a same piece of QoS information for the messages of the same service type.

In the above technical solution, the message modification rule is set based on the service type set by the service device. Message of a same service type are transmitted by a same regional access device. The same regional access device sets the same piece of QoS information for the messages of the same service type. As such, in the process of transmitting the message that needs to be transmitted, the traversed regional access device can timely and accurately match the piece of QoS information corresponding to itself, and can update the QoS value of the message that needs to be transmitted based on the corresponding piece of QoS information, respectively. Thus, the regional access device can timely and accurately provide appropriate network transmission resources for the message that needs to be transmitted based on the update QoS value in the message that needs to be transmitted.

Another aspect of the present disclosure provides a data transmission apparatus. The data transmission apparatus includes: a determination unit configured to determine M pieces of QoS information, where the M pieces of QoS information are generated according to a QoS value set by each regional access device for a message that needs to be transmitted, and M is an integer greater than 1; and a processing unit configured to, after it is determined that a device identifier in a first piece of QoS information is consistent with a device identifier of the regional access device, update the QoS value of the message that needs to be transmitted with a first QoS value in the first piece of QoS information, and forward the updated message that needs to be transmitted, where the first piece of QoS information is any one of the M pieces of QoS information.

In some embodiments, the determination unit is further configured to: determine the message to be transmitted contains M pieces of QoS information if it is determined that a preset field in the basic header of the message that needs to be transmitted is set with a set identifier, where the M pieces of QoS information are located in the extension header of the message that needs to be transmitted.

In some embodiments, the determining unit is further configured to: determine the M pieces of QoS information that are set according to an order of the regional access devices that the message that needs to be transmitted traverses in series in the process of transmitting the message, and determine each piece of QoS information that includes the device identifier of the corresponding regional access device and the QoS value set by the corresponding regional access device.

In some embodiments, the processing unit is further configured to: determine the first piece of QoS information located in the extended header of the message that needs to be transmitted; and determine that the device identifier in the first piece of QoS information is consistent with the device identifier of the regional access device.

In some embodiments, the processing unit is further configured to: after the QoS value of the message that needs to be transmitted is updated to the first QoS value in the first piece of QoS information, delete the first piece of QoS information from the extension header.

In some embodiments, the processing unit is further configured to: before updating the QoS value of the message that needs to be transmitted to the first QoS value in the first piece of QoS information, set the validity flag bit in the first piece of QoS information to valid.

In some embodiments, the processing unit is further configured to: delete the piece of QoS information whose validity flag is valid.

Another aspect of present disclosure provides a data transmission apparatus. The data transmission apparatus includes: a generation unit configured to generate a message that needs to be transmitted, wherein the message that needs to be transmitted includes M pieces of QoS information, the M pieces of QoS information are generated according to a QoS value set by each regional access device for a message that needs to be transmitted, and M is an integer greater than 1; and a transmitting unit configured to transmit the message that needs to be transmitted.

In some embodiments, the generating unit is further configured to: generate the initial message that needs to be transmitted by the service device; determine a message modification rule of the initial message according to the service type of the initial message, where each message modification rule corresponds to at least one piece of QoS information; and add the M pieces of QoS information to the extension header of the initial message according to the message modification rule, and set the set flag in the preset field of the basic header of the initial message to obtain the message that needs to be transmitted.

In some embodiments, the generating unit is further configured to: generate the message modification rule by the control terminal based on the service type set by the service device, where the messages of the same service type are transmitted through the same regional access device, and the pieces of QoS information set for the messages of the same service type by the same regional access device are the same.

Another aspect of the present disclosure provides a computing device. The computing device includes: at least one processor; and at least one memory, wherein the at least one memory stores a computer program, and when being executed by the at least one processor, the computer program causes the at least one processor to perform the disclosed method.

Another aspect of the present disclosure provides a computer-readable storage medium. The computer-readable storage medium stores a computer program executable by a computing device, and when the computer program runs on the computer device, the computer program causes the computing device to perform the disclosed method.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

FIG. 6 is a schematic diagram of a message header of an exemplary IPv6 message carrying the multi-segment QoS information according to some embodiments of the present disclosure;

DETAILED DESCRIPTION OF THE EMBODIMENTS

Figure 1:
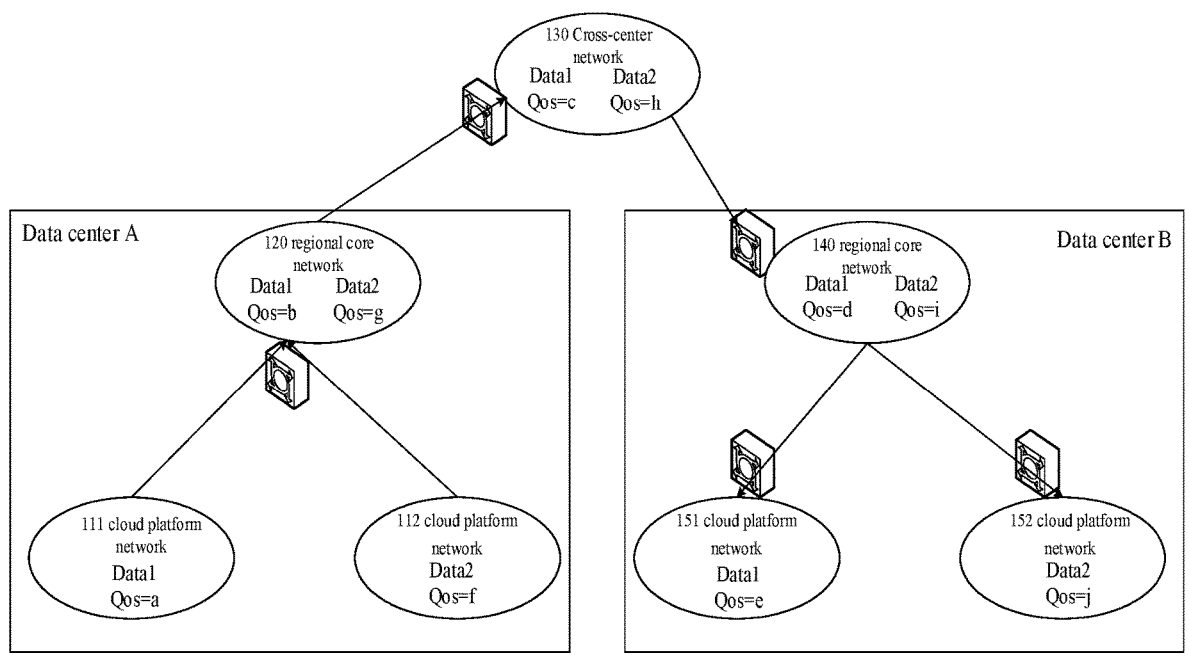
FIG. 1 is a schematic diagram of an architecture of an exemplary data transmission system according to some embodiments of the present disclosure.

In order to make the objectives, technical solutions, and advantages of the present disclosure clearer, the present disclosure will be further described in detail below with reference to the accompanying drawings. Obviously, the described embodiments are only a part of the embodiments of the present disclosure, not all of the embodiments. Based on the embodiments of the present disclosure, all other embodiments obtained by those of ordinary skill in the art without creative efforts shall fall within the protection scope of the present disclosure.

The design ideas of the embodiments of the present disclosure are briefly introduced below.

When a data message is transmitted in a network, the data message often traverses a plurality of network areas. Different areas include different network devices, have different circuit bandwidths, and carry different services. Thus, when the data message traverses different network areas, different quality of service (QoS) values need to be configured according to actual conditions in the different network areas to assign suitable network resources to ensure a smooth transmission of the data message within each of the different network areas.

At this stage, because the QoS value of the data message corresponding to a boarder network device in each area is different, when the data message is transmitted through different network areas, it is necessary to incorporate configuration of the border network device in each area to modify the QoS value of the data message, thereby ensuring the smooth transmission of the data message as the data message traverses the different network areas. For example, the network devices are Huawei switches, and a large number of configurations need to be added to the area border network devices to modify the QoS value. Specifically, configuration modification includes (1) adding an access control list (ACL) policy to identify a data flow. That is, adding [Huawei] ad 3999, and [Huawei-acl-3999] rule 5 permit ip source 192.168.20.10 destination 192.168.10.10// identifying the data flow using source IP and destination IP. The configuration modification further includes (2) classifying the data flow using a traffic classifier. That is, [Huawei] traffic classifier A1 operator and//defining a traffic classifier A1, "and" parameter represents taking effect only when ad defined in the traffic classifier is totally matched, and [Huawei-classifier-A] if-match ad 3999//the traffic classifier matches data messages defined by ad 3999. The configuration modification further includes (3) modifying the QoS value of the data flow. That is, [Huawei] traffic behavior A1//creating a traffic behavior A1, and [Huawei-behavior-boss] remark dscp b//modifying the QoS value of the traffic behavior A1 to b. The configuration modification further includes (4) associating the traffic classification with the traffic behavior in the data flow policy. That is, [Huawei] traffic policy A1-priority//creating a traffic policy namely A1-prority, and [Huawei-trafficpolicy-A1-prority] classifier A1 behavior A1//associating the boss' traffic classification with the traffic behavior. The configuration modification finally includes (5) the traffic policy is applied on the interface of the network device. That is, [Huawei-Serial4/0/0] traffic-policy A1-priority outbound//applying the traffic policy A1-priority to an outbound direction of an uplink interface, and [Huawei-Serial4/0/0] quit. As such, it can be seen that each time the QoS value is modified in the processing method, ten configuration modifications need to be added to the border network device, which makes the workload very heavy, resulting in low efficiency of modifying the QoS value.

In view of this, the embodiments of the present disclosure are provided. In some embodiments, when a regional access device determines that a to-be-transmitted message contains M pieces of QoS information (i.e., service quality QoS information), and a device identifier in a first piece of QoS information is determined to be consistent with a device identifier of the regional access device, the QoS value of the message that needs to be transmitted is updated to a first QoS value in the first piece of QoS information, and the updated message is forwarded. The M pieces of QoS information are generated according to the QoS values set by the access devices in each area for the message that needs to be transmitted. The first piece of QoS information is any one of the M pieces of QoS information. By adding corresponding configuration to the message that needs to be transmitted, that is, inserting the M pieces of QoS information into the message that needs to be transmitted, the QoS value in different network regions can be updated without adding any configuration to the regional access device. Thus, automatically updating the QoS value in different network regions can be achieved, a workload resulted from modifying the QoS value in different network regions can be reduced, and maintenance convenience is achieved at the same time.

To facilitate understanding of the embodiments of the present disclosure, a data transmission system architecture consistent with the embodiments of the present disclosure is described with reference to FIG. 1. The data transmission system architecture can be applied to the transmission of transaction data messages in different network areas, and of course can also be applied to the transmission of picture data messages or video data messages in different network areas, which is not limited by the embodiments of the present disclosure. As shown in FIG. 1, the system architecture may include a data center A, a cross-center network 130, and a data center B.

In some embodiments, the data center A can transmit data messages to the data center B. Of course, the data center B can also transmit data messages to the data center A.

For illustration purpose, the data center A transmits the data message to the data center B, and a data message transmission process is described accordingly. The data center A may include at least one cloud platform network (e.g., a cloud platform network 111 and a cloud platform network 112, etc.) and a regional core network 120. The regional core network 120 is configured to receive data messages transmitted by the cloud platform network 111, and the cloud platform network 112, etc., and to forward received data messages. That is, the regional core network 120 is used for aggregation and forwarding of the data messages. The cloud platform network 111 or the cloud platform network 112 may generate one or more data messages, and the one or more data messages carry QoS information. If multiple data messages are generated, the multiple data messages may be data messages of a same service type, or may be data messages of different service types, which are not limited in the embodiments of the present disclosure.

The cross-center network 130, which is equivalent to a transit station, is used to receive the data messages transmitted from each data center, and to distribute the data messages to corresponding destinations based on destination addresses carried by the data messages transmitted from each data center.

Data center B may include at least one cloud platform network (e.g., a cloud platform network 151, and a cloud platform network 152, etc.) and a regional core network 140. The regional core network 140 is configured to receive the data messages transmitted across the central network 130 and to forward the received data messages. That is, the regional core network 140 is used for aggregation and forwarding of the data messages. The regional core network 140 distributes the data messages to the corresponding cloud platform network (e.g., the cloud platform network 151 or the cloud platform network 152) based on the destination address carried in the received data messages.

In some embodiments, the data message transmission process is described when the data messages are generated by the cloud platform network 111. The cloud platform network 111 generates a data message Data1. The data message Data1 carries multiple pieces of QoS information, and the QoS values corresponding to the multiple pieces of QoS information are a, b, c, d, and e, respectively. The multiple pieces of QoS information are also called multi-segment QoS information. In the specification, the multiple pieces of QoS information and the multi-segment QoS information are used interchangeably. The cloud platform network 111 allocates appropriate network resources for the data message Data1 based on the QoS value a carried in the data message Data1 to transmit the data message Data1 to the regional core network 120. A regional access device (such as a switch) of the regional core network 120 receives the data message Data1, and determines whether the data message Data1 contains the multiple pieces of QoS information. After the regional access device determines that the data message Data1 contains the multiple pieces of QoS information and determines that a device identifier in a first piece of QoS information in the multiple pieces of QoS information is consistent with a device identifier of the regional core network 120, the QoS value of the data message Data1 is updated to b. Thus, based on the QoS value b, the regional core network 120 allocates appropriate network resources to transmit the data message Data1 to the cross-center network 130.

After receiving the data message Data1, a regional access device (such as a switch) of the cross-center network 130 determines whether the data message Data1 contains multiple pieces of QoS information. After the regional access device of the cross-center network 130 determines that the data message Data1 contains multiple pieces of QoS information and determines that the device identifier in the first piece of QoS information of the multiple pieces of QoS information is consistent with the device identifier of the cross-center network 130, the QoS value of the data message Data1 is updated to c. In this way, based on the QoS value c, the cross-center network 130 allocates appropriate network resources to transmit the data message Data1 to the regional core network 140. After receiving the data message Data1, the regional access device (such as a switch) of the regional core network 140 determines whether the data message Data1 contains multiple pieces of QoS information. After the regional access device of the regional core network 140 determines that the data message Data1 contains multiple pieces of QoS information and determines that the device identifier in the first piece of QoS information of the QoS information is consistent with the device identifier of the regional core network 140, the QoS value of the data message Data1 is updated to d. In this way, based on the QoS value d, the regional core network 140 allocates appropriate network resources to transmit the data message Data1 to the destination (the cloud platform network 151) corresponding to the data message Data1. After receiving the data message Data1, the regional access device (such as a switch) of the cloud platform network 151 can determine whether the data message Data1 contains multiple pieces of QoS information. If it is determined that the data message Data1 contains multiple pieces of QoS information and it is determined that the device identifier in the first piece of QoS information of the multiple pieces of QoS information is consistent with the device identifier of the cloud platform network 151, the QoS value of the data message Data1 is updated to e. As such, based on the QoS value e, the cloud platform network 151 allocates appropriate network resources for the data message Data1, and continues to transmit the data message Data1. If it is determined that the data message Data1 does not contain multiple pieces of QoS information, the data message Data1 may continue to be transmitted based on the network resources corresponding to the QoS value in the data message Data1.

It should be noted that the structure shown in FIG. 1 above is only an example, which is not limited in the embodiments of the present disclosure.

Figure 2:
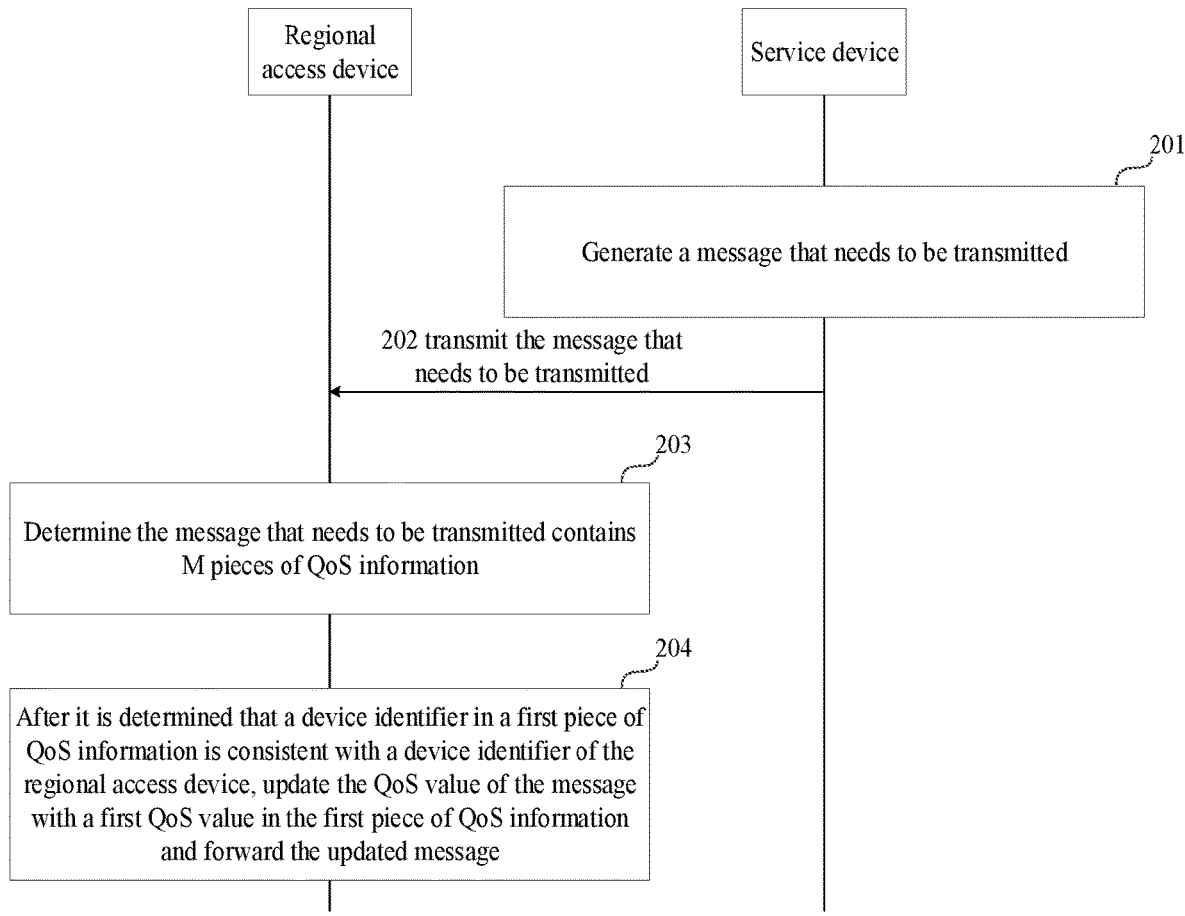
FIG. 2 is a flowchart of an exemplary data transmission method according to some embodiments of the present disclosure.

Based on the above description, FIG. 2 is a flowchart of an exemplary data transmission method according to some embodiments of the present disclosure, and the flowchart may be executed by a data transmission apparatus.

As shown in FIG. 2, the flowchart specifically includes:

At step 201, a service device generates a message that needs to be transmitted.

At step 202, the service device transmits the message that needs to be transmitted to a regional access device.

At step 203, the regional access device determines whether the message that needs to be transmitted contains M pieces of QoS information.

At step 204, when the regional access device determines that the device identifier in the first piece of QoS information is consistent with the device identifier of the regional access device, the regional access device updates the QoS value of the message that needs to be transmitted to the first piece of QoS information and forwards the updated message that needs to be transmitted.

In the above steps 201 and 202, the service device generates the message that needs to be transmitted, and transmits the message that needs to be transmitted to the regional access device. Alternatively, the message that needs to be transmitted may also be sent to other network devices (for example, other servers or other network transmission devices, etc.) The message that needs to be transmitted may include M pieces of QoS information (i.e., service quality QoS information). The M pieces of QoS information are generated according to the QoS values set by each regional access device for the message that needs to be transmitted. M is an integer greater than 1. Specifically, the service device generates an initial message that needs to be transmitted, and determines a message modification rule for the initial message according to a service type of the initial message. Then according to the message modification rule, the service device adds the M pieces of QoS information in an extension header of the initial message, and sets a setting flag in a preset field of a basic header of the initial message to obtain the message that needs to be transmitted. Each message modification rule corresponds to at least one piece of QoS information. The message modification rule is generated by a control terminal based on the service type set by the service device. Messages of a same service type are transmitted through a same regional access device, and the same regional access device sets a same piece of QoS information for the messages of the same service type. Alternatively, before the service device needs to forward the initial message of a certain service type, the service device transmits a request to the control terminal to obtain a flow message operation logic, such that the service device can obtain the flow message operation logic of the corresponding service type, and according to the flow message operation logic, can modify a header of the initial message of this service type. In this way, by adding corresponding configuration to the message that needs to be transmitted, that is, inserting the M pieces of QoS information into the message that needs to be transmitted, the QoS value can be updated in different network areas without adding additional configuration in the regional access device. Thus, the QoS values in different network areas can be automatically updated, and the regional access device in each network area can provide appropriate network transmission resources based on the updated QoS values in the message that needs to be transmitted in a timely and accurate manner.

In the above steps 203 and 204, the regional access device determines whether the message that needs to be transmitted contains M pieces of service quality QoS information. After the regional access device determines that the device identifier in the first piece of QoS information is consistent with the device identifier of the regional access device, the regional access device updates the QoS value in the message that needs to be transmitted to the first QoS value in the first piece of QoS information, and forwards the updated message that needs to be transmitted. Meanwhile, after the QoS value in the message that needs to be transmitted is updated to the first QoS value in the first piece of QoS information, the first piece of QoS information is deleted from the extension header of the message that needs to be transmitted. Specifically, the regional access device determines whether the preset field in the basic header of the message that needs to be transmitted is set with a setting identifier, and if it is determined that the preset field in the basic header of the message that needs to be transmitted is set with the setting identifier, then it is determined that the message that needs to be transmitted contains M pieces of QoS information. The M pieces of QoS information are located in the extension header of the message that needs to be transmitted. The M pieces of QoS information are set according to an order of the regional access device in each area that the message that needs to be transmitted traverses in series during the transmission process, and each piece of QoS information includes the device identifier of the corresponding regional access device and the QoS value set by the corresponding regional access device for the message that needs to be transmitted. In this way, during the transmission process of the message that needs to be transmitted, the regional access device in each traversed network area can timely and accurately match the corresponding QoS information, and can update the QoS value in the message that needs to be transmitted based on the corresponding QoS information. As such, each regional access device can provide appropriate network transmission resources to transmit the message that needs to be transmitted timely and accurately based on the updated QoS value in the message that needs to be transmitted. It should be noted that the message that needs to be transmitted received by the regional access device may be forwarded by the service device, or may be forwarded by other network devices, which is not limited in the embodiments of the present disclosure.

In addition, after determining that the message that needs to be transmitted contains the M pieces of QoS information, the regional access device determines the first piece of QoS information located in the extension header of the message that needs to be transmitted, and determines whether the device identifier in the first piece of QoS information is consistent with the device identifier of the regional access device. If so, the regional access device updates the QoS value of the message that needs to be transmitted to the first QoS value in the first piece of QoS information, and sets a validity flag bit in the first piece of QoS information to be valid, which can facilitate the regional access device to determine that the first piece of QoS information in the basic header of the message that needs to be transmitted is valid, accurate and available. At the same time, it is convenient for the regional access device to accurately identify the first QoS value in the first piece of QoS information in the basic header of the message that needs to be transmitted, and timely and accurately provide appropriate network transmission resources to transmit the message that needs to be transmitted based on the first QoS value. Then the regional access device deletes the piece of QoS information in which the validity flag bit is set be valid to ensure that the regional access device that receives the message that needs to be transmitted can accurately match the corresponding piece of QoS information. As such, the regional access device can provide appropriate network transmission resources to ensure the smooth transmission of the message that needs to be transmitted. Then, the updated message that needs to be transmitted is forwarded. For example, the updated message that needs to be transmitted may be forwarded to other network devices in the same network area, or may be directly forwarded to the regional access device or the service device in other network areas, which is not limited in the embodiments of the present disclosure. The regional access device in other network areas may process the received message that needs to be transmitted and forward them according to the manner in which the regional access device in the previous network area processes the message that needs to be transmitted.

In view of this, a message structure consistent with the embodiments of the present disclosure is described below.

Figure 3:
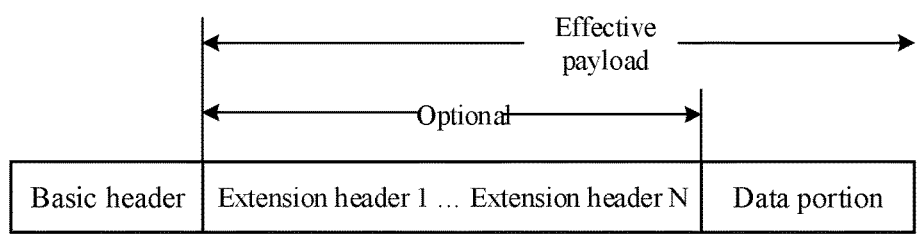
FIG. 3 is a schematic diagram of a message structure of an exemplary IPv6 message according to some embodiments of the present disclosure.
Figure 4:
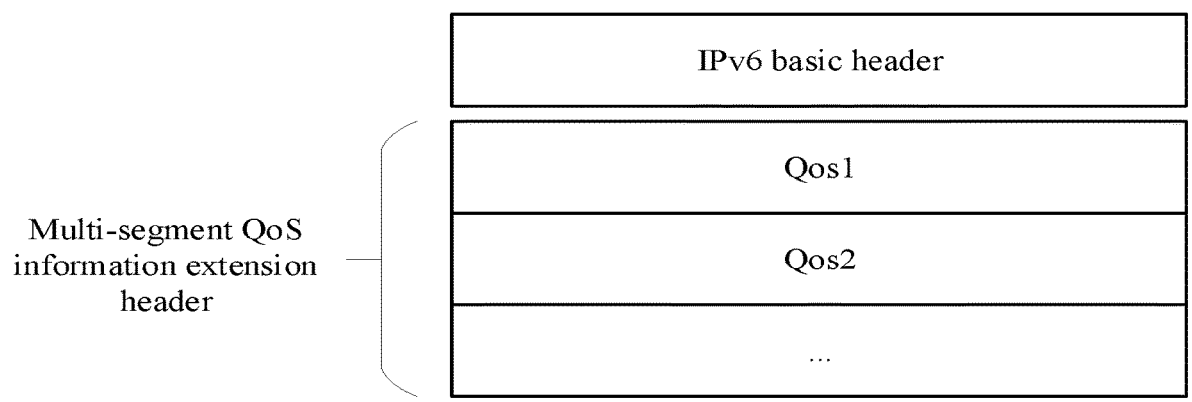
FIG. 4 is a schematic diagram of a message structure of an exemplary IPv6 message carrying multi-segment QoS information according to some embodiments of the present disclosure.
Figure 5:
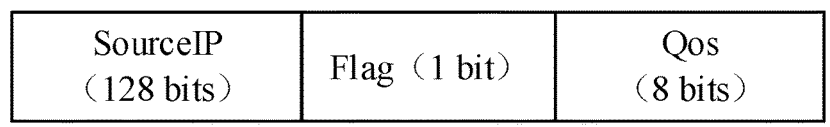
FIG. 5 is a schematic diagram of a data segment of QoS information according to some embodiments of the present disclosure.

For illustration purpose, the message structure is a message structure for an Internet protocol version 6 (IPv6) message. FIG. 3 is a schematic diagram of a message structure of an exemplary IPv6 message according to some embodiments of the present disclosure. The IPv6 message is different from an Internet protocol version 4 (IPv4) message. In addition to the basic header configured for carrying basic forwarding information of the data message, the message header of the IPv6 message also includes extension headers (i.e., extension header 1, extension header 2, etc.) For an extension portion of the IPv6 message, Internet Engineering Task Force (IETF) standard organization does not limit its length and structure. Thus, in some embodiments, a header section in the IPv6 message structure is designed to carry multi-segment QoS values. Because the IPv6 message in this format carries multi-segment QoS information, the message structure of the IPv6 message in this format is a list model, and each piece of data in the list is loaded with a piece of QoS information. The message structure of the IPv6 message carrying multi-segment QoS information may be shown in FIG. 4. In addition, in each data segment carrying QoS information, the message structure of the data segment of QoS information may be shown in FIG. 5.

FIG. 6 is a schematic diagram of a message header of an exemplary IPv6 message carrying the multi-segment QoS information according to some embodiments of the present disclosure. As shown in FIG. 6, in the process of configuring an extension portion of the message header of the IPv6 message, a specific data value (such as FF) is configured in a next header field in the basic header of the IPv6 message. The specific data value indicates that the message is a message containing multi-segment QoS information extension header. After the basic header, a multi-segment QoS field is inserted, and a subsequent description for the multi-segment QoS field will be expressed in the form of List<Qos>. An nth node in the multi-segment QoS field is represented as List<Qos>[n−1]. In practical application scenarios, a length of List<Qos> and contents in List<Qos> can be set as needed according to a number of times the QoS value is modified.

Figure 7:
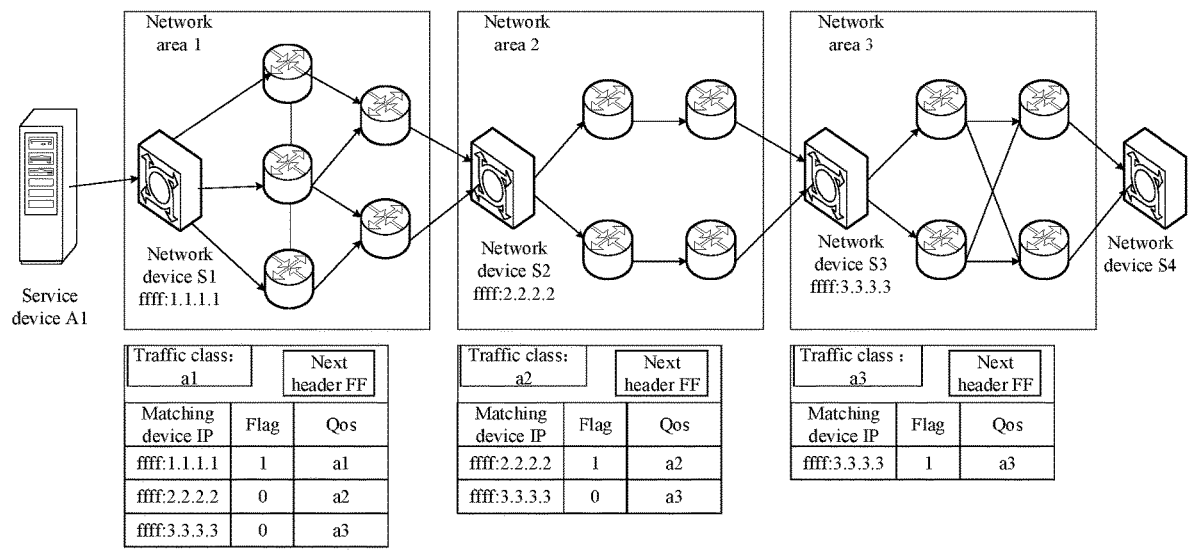
FIG. 7 is a schematic diagram of processing and forwarding an IPv6 message based on a network device IP address according to some embodiments of the present disclosure.

In addition, FIG. 7 is a schematic diagram of processing and forwarding an IPv6 message based on a network device IP address according to some embodiments of the present disclosure. As shown in FIG. 7, in the process of transmitting the IPv6 message, when a network device S1 receives the IPv6 message transmitted from a service device A1, the network device S1 determines whether a value of the next header field in the basic header of the IPv6 message is FF or not. If it is determined that the value of the next header field in the basic header of the IPv6 message is FF, it is determined that the IPv6 message contains multiple pieces of QoS information. At this time, the network device S1 will read a first node in the multi-segment QoS information, that is, the data in List<Qos>[0]. Next, the network device S1 compares a device IP of the network device S1 with a device IP in the first node. If the device IP of the network device S1 is equal to the device IP in the first node, the network device S1 sets a flag or a flag bit in List<Qos>[0] to 1, and sets a value of a traffic classification field in the basic header of the IPv6 message to the QoS value in List<Qos>[0]. Next, the network device S1 deletes List<Qos>[0] from the multi-segment QoS information, and forwards the IPv6 message after deleting List<Qos>[0]. If the device IP of the network device S1 is not equal to the device IP in the first node, the network device S1 forwards the IPv6 message directly according to a current data format of the IPv6 message. In this case, Flag=1 indicates that the basic header of the IPv6 message after the QoS value is updated is valid, which can facilitate subsequent network devices in the transmission process of the IPv6 message after the QoS value is updated to determine that the QoS information in the basic header of the IPv6 message after the QoS value is updated is valid, accurate and available. At the same time, the subsequent network devices are facilitated to accurately identify the QoS value of the QoS information in the basic header of the IPv6 message after the QoS value is updated, and to provide appropriate network transmission resources timely and accurately for forwarding the IPv6 message based on the QoS value. It should be noted that, in the process of transmitting the IPv6 message, the subsequent network devices can process the received IPv6 message and forward the received IPv6 message according to the manner in which the network device S1 processes the IPv6 message.

In some embodiments, the service device A1 generates an IPv6 message that needs to be transmitted, and transmits the IPv6 message that needs to be transmitted to the network device S1 in a network area 1. The network device S1 receives the IPv6 message transmitted from the service device A1. Next, the network device S1 determines whether the value of the next header field in the basic header of the IPv6 message is FF. If it is determined that the value of the next header field in the basic header of the IPv6 message is FF, then the network device S1 determines that the IPv6 message contains three pieces of QoS information. At this time, the network device S1 will read the first node in the three pieces of QoS information, that is, the data in List<Qos>[0]. The data in the List<Qos>[0] includes a matching device IP ffff: 1.1. 1.1, a Flag 0, a QoS value a1. Next, when it is determined that the device IP (ffff: 1.1.1.1) of the network device S1 is equal to the device IP (ffff: 1.1.1.1) in the first node, the network device S1 sets the Flag field in List<Qos>[0] to 1, and sets a value of a traffic classification field in the basic header of the IPv6 message to the QoS value a1 in List<Qos>[0]. At the same time, List<Qos>[0] is deleted from the three pieces of QoS information, and the IPv6 message is forwarded after List<Qos>[0] is deleted. It is assumed that other network devices in the network area 1 do not update the value of the traffic classification field in the basic header of the IPv6 message in the process of transmitting the IPv6 message. After the network device S1 forwards the IPv6 message to the network device S2 in a network area 2, the network device S2 receives the IPv6 message transmitted from the network device S in the network area 1, and determines whether the value in the next header field in the basic header of the IPv6 message is FF. If it is determined that the value in the next header field in the basic header of the IPv6 message is FF, it is determined that the IPv6 message contains two pieces of QoS information. At this time, the network device S2 will read the first node in the two pieces of QoS information, that is, the data in List<Qos>[0]. The data in the List<Qos>[0] includes a matching device IP ffff:2.2. 2.2, a Flag 0, and a QoS value a2. Next, when the network device S2 determines that the device IP (ffff: 2.2.2.2) of the network device S2 is equal to the device IP (ffff: 2.2.2.2) in the first node, the network device S2 sets the Flag field in List<Qos>[0] to 1, and sets the value of the traffic classification field in the basic header of the IPv6 message to the QoS value a2 in List<Qos>[0]. At the same time, the network device S2 deletes List<Qos>[0] from the two pieces of QoS information, and forwards the IPv6 message after List<Qos>[0] is deleted.

Figure 8:
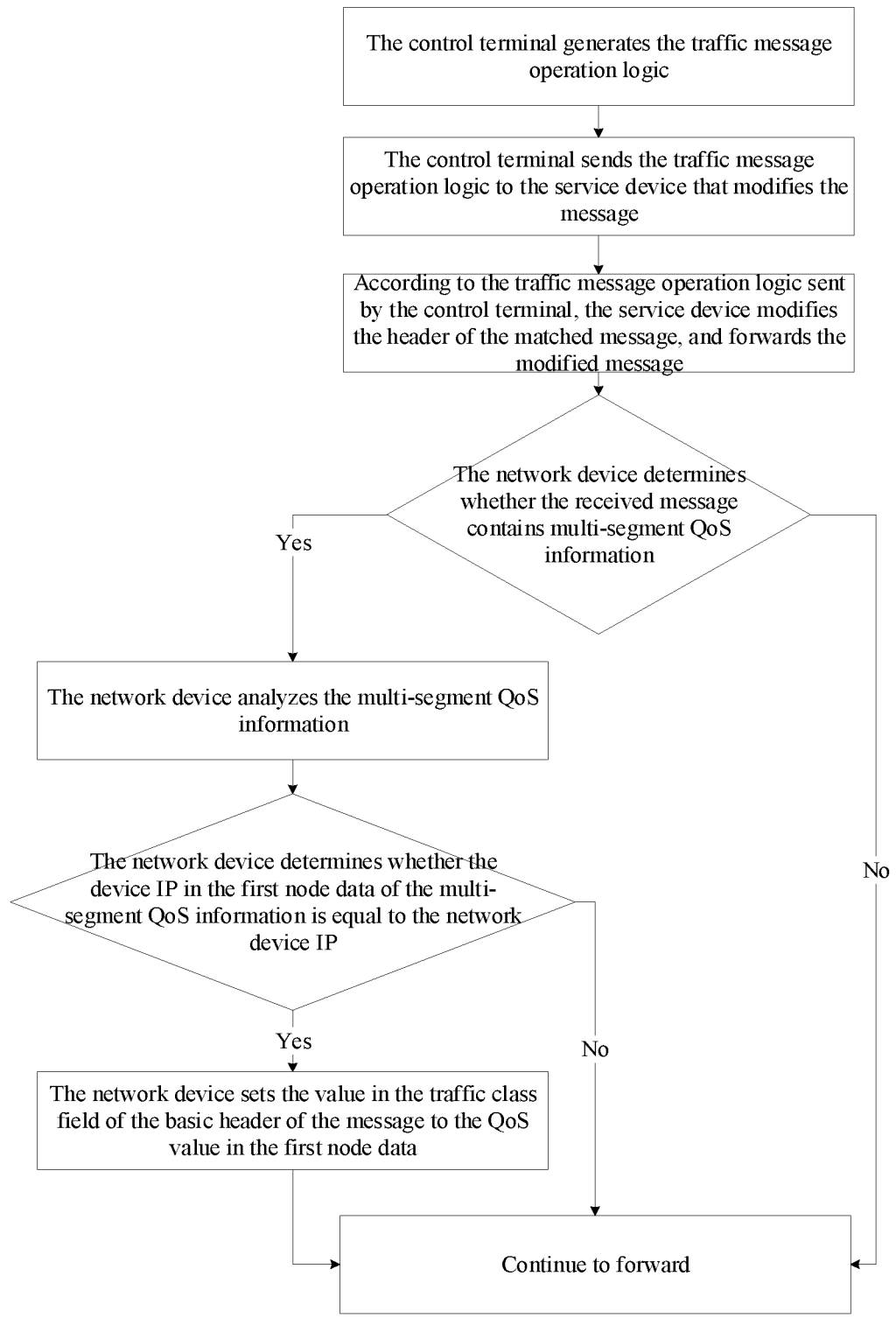
FIG. 8 is a flowchart of another exemplary data transmission method according to some embodiments of the present disclosure.

In view of this, an implementation process of the data transmission method consistent with the embodiments of the present disclosure will be described in detail below with reference to FIG. 7 and FIG. 8. FIG. 8 is a flowchart of another exemplary data transmission method according to some embodiments of the present disclosure.

Step 1: a control terminal generates a traffic message operation logic.

In some embodiments, the control terminal generates the traffic message operation logic corresponding to a service type according to the service type set by a service device. The traffic message operation logic may include message modification, composition of multi-segment QoS information carried by a modified message, and a service node (or a service device) corresponding to the modified message (or a regional access device first traversed in a process of transmitting the modified message).

In some embodiments, the control terminal consistent with the embodiments of the present disclosure sets a traffic message operation logic, which includes the following specifics.

a. message modification: a service 1 traffic message.

In some embodiments, the service 1 traffic message carries a message matching element. The message matching element may include a message identifier, a source IP address, a source port, a destination IP address, a destination port, and a transport layer protocol of the service 1 traffic message.

b. the composition of the multi-segment QoS information carried by the modified message may be as shown in Table 1.

TABLE 1

| Sequence number | Matching device IP | QoS value |
|---|---|---|
| 1 | ffff:1.1.1.1 | a1 |
| 2 | ffff:2.2.2.2 | a2 |
| 3 | ffff:3.3.3.3 | a3 | c. the service node corresponding to the modified message: A1.

Step 2: the control terminal sends the traffic message operation logic to the service node corresponding to the modified message.

In some embodiments, the data transmission method includes sending by the control terminal the traffic message operation logic to the service node corresponding to the modified message. However, it should be noted that, after the control terminal generates the traffic message operation logic, in addition to sending the traffic message operation logic to the service node (such as A1) corresponding to the modified packet and facilitating the service node corresponding to the modified message to update the message header of the modified message based on the traffic message operation logic, the control terminal can also send the traffic message operation logic to the regional access device first traversed in the process of transmitting the modified message, and facilitate the regional access device to update the message header of the modified message. It should be understood that when the service node corresponding to the modified message is known, the regional access device first traversed in the process of transmitting the modified message is also known accordingly. The service node and the first traversed regional access device are corresponding to each other.

Step 3: the service node corresponding to the modified message updates the message header of the corresponding modified message according to the traffic message operation logic.

After receiving the traffic message operation logic, the service node can match at least one corresponding initial message from a plurality of initial messages generated by the service node according to the message matching element in the traffic message operation logic. Next, the message header of the at least one initial message is updated according to the multi-segment QoS information in the traffic message operation logic, and the updated at least one initial message is forwarded. Alternatively, the service node receives multiple traffic message operation logics for different service types sent by the control terminal. After the service node generates the initial message, based on the service type in the initial message, the service node can determine the traffic message operation logic correspond to the service type from the multiple traffic message operation logics for different service types. Next, the service node updates the message header of the initial message according to the multi-segment QoS information in the traffic message operation logic, and forwards the updated initial message. It should be noted that, in the embodiments of the present disclosure, the data transmission method is described assuming that the service node forwards the updated initial message to the regional access device. Of course, the service node may also forward the updated initial message to other service nodes or other devices.

In some embodiments, after receiving the traffic message operation logic, the service node A1 may match a corresponding service 1 traffic message from multiple initial messages generated by the service node A1 according to the message matching element in the traffic message operation logic. Next, according to the multi-segment QoS information in the traffic message operation logic, the service node A1 modifies the message header of the service 1 traffic message, and forwards the modified service 1 traffic message. Alternatively, the service node A1 receives multiple traffic message operation logics for different service types sent by the control terminal. After the service node A1 generates the service 1 traffic message, the service node A1 can determine the traffic message operation logic corresponding to the service 1 traffic message from the multiple traffic message operation logics for different service types according to the message matching element for the service 1 traffic message. Next, the service node A1 updates the message header of the service 1 traffic message according to the multi-segment QoS information in the traffic message operation logic, and forwards the updated service 1 traffic message.

It should be noted that the service node can receive multiple traffic message operation logics for different service types sent by the control terminal in advance, and can store the multiple traffic message operation logics for different service types locally. After one initial message is generated, the traffic message operation logic of the corresponding service type can be matched according to the service type of the initial message. Alternatively, a monitoring mechanism can be established between the control terminal and the service node. When the control terminal detects that the service node forwards the initial packet, the control terminal prevents the service node from forwarding, and delivers the multiple traffic message operation logics for different service types to the service node. The service node modifies the message header of the corresponding at least one initial message according to the multiple traffic message operation logics for different service types. Alternatively, before the service node needs to forward the initial message of a certain service type, the service node sends an acquisition request for the traffic message operation logic to the control terminal to obtain the traffic message operation logic of the corresponding service type, and modifies the message header of the initial message of this service type according to the traffic message operation logic. The embodiments of the present disclosure do not limit this.

In addition, if the control terminal updates the traffic message operation logic of a certain type or several types based on requirements of the service node or the actual application scenario, the control terminal can proactively send the updated traffic message operation logic to the service node, or can send the updated traffic message operation logic to the service node based on the acquisition request for the traffic message operation logic sent by the service node.

Step 4: the regional access device determines whether the received message contains the multi-segment QoS information.

In some embodiments, after the network device S1 receives the initial message (such as an IPv6 message) sent by the service device A1, the network device S1 determines whether the value of the next header field in the basic header of the initial message is FF, and if it is determined that the value of the next header field in the basic header of the initial message is FF, it is determined that the initial message contains multi-segment QoS information. At this time, the network device S1 will read the first node in the multi-segment QoS information, that is, the data in List<Qos>[0]. The data in List<Qos>[0] includes the matching device IP ffff:1.1.1.1, Flag 0, and QoS value a1. Next, when it is determined that the device IP (ffff: 1.1.1.1) of the network device S1 is equal to the device IP (ffff: 1.1.1.1) in the first node, the Flag in List<Qos>[0] is set to 1, and the value of the traffic classification field in the basic header of the initial message is set to the QoS value a1 in List<Qos>[0]. At the same time, List<Qos>[0] is deleted from the multi-section QoS information, and the initial message is forwarded after List<Qos>[0] is deleted. It should be noted that the message that needs to be transmitted received by the regional access device may be forwarded by the service device A1 or forwarded by other network devices, which is not limited in the embodiments of the present disclosure.

Step 5: in the process of transmitting the initial message, subsequent network devices can process the received initial message and forward the received initial message according to the manner in which the regional access device (e.g., the network device S1) processes the initial message.

It should be noted that, in addition to determining whether to modify the message header of the message in the device according to the device IP, in some other embodiments, a device ID can be self-defined, and the device ID can be used to determine whether to modify the message header of the message in the device. In the scenario of the self-defined device ID, a device ID length does not have to be fixed at 128 bit, and can also be adjusted according to actual needs.

Figure 9:
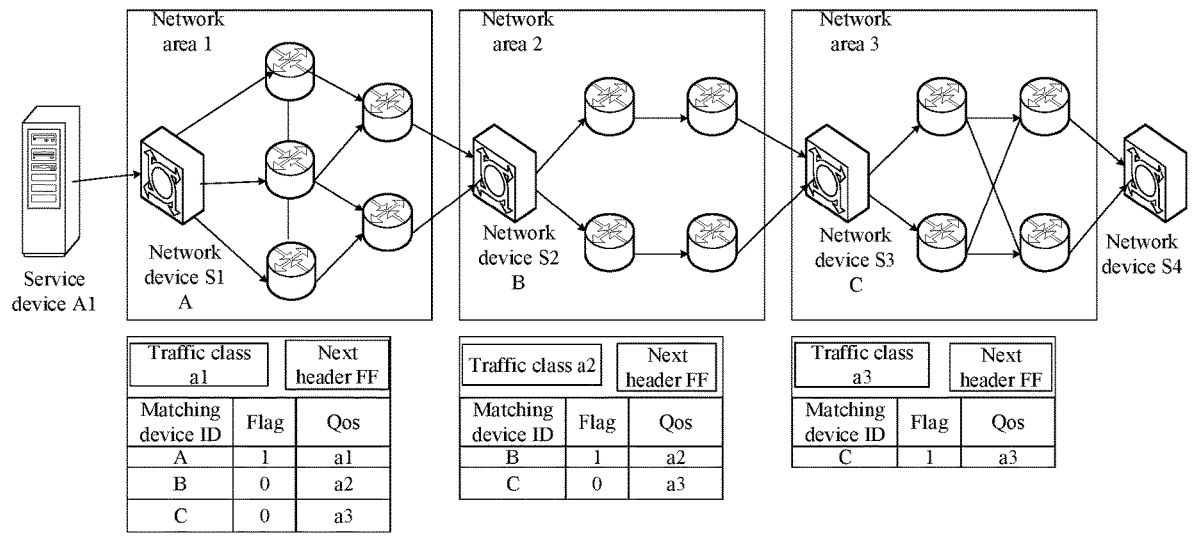
FIG. 9 is a schematic diagram of processing and forwarding an IPv6 message based on a network device ID according to some embodiments of the present disclosure.

FIG. 9 is a schematic diagram of processing and forwarding an IPv6 message based on a network device ID according to some embodiments of the present disclosure. In some embodiments, as shown in FIG. 9, the service device A1 generates an IPv6 message that needs to be transmitted, and sends the IPv6 message that needs to be transmitted to the network device S1 in the network area 1. After the network device S1 receives the IPv6 message sent by the service device A1, the network device S1 determines whether the value of the next header field in the basic header of the IPv6 message is FF. If it is determined that the value of the next header field in the basic header of the IPv6 message is FF, then the network device S1 determines that the IPv6 message contains three pieces of QoS information. At this time, the network device S1 will read the first node in the three pieces of QoS information, that is, the data in List<Qos>[0]. The data in List<Qos>[0] includes the matching device ID A, Flag 0, and QoS value a1. Next, when it is determined that the device ID (A) of the network device S1 is equal to the device ID (A) in the first node, the network device S1 sets Flag in List<Qos>[0] to 1, and sets the value of the traffic classification field in the basic header of the IPv6 message to QoS value a1 in List<Qos>[0]. At the same time, List<Qos>[0] is deleted from the three pieces of QoS information, and the IPv6 message is forwarded after List<Qos>[0] is deleted. It is assumed that other network devices in the network area 1 do not update the value of the traffic classification field in the basic header of the IPv6 message in the process of transmitting the IPv6 message. When the IPv6 message is forwarded to the network device S2 in the network area 2, after receiving the IPv6 message sent by the network device S1 in the network area 1, the network device S2 determines whether the value of the next header in the basic header of the IPv6 message is FF. If the value of the next header field in the basic header of the IPv6 message is determined to be FF, it is determined that the IPv6 message contains two pieces of QoS information. At this time, the network device S2 will read the first node in the two pieces of QoS information, that is, the data in List<Qos>[0]. The data in List<Qos>[0] includes the matching device ID B, Flag 0, and QoS value a2. Next, when it is determined that the device ID (B) of the network device S2 is equal to the device ID (B) in the first node, the network device S2 sets Flag in List<Qos>[0] to 1, and sets the value of the traffic classification field in the basic header of the IPv6 message to QoS value a2 in List<Qos>[0]. At the same time, List<Qos>[0] is deleted from the two pieces of QoS information, and the IPv6 message is forwarded after List<Qos>[0] is deleted.

In the embodiments of the present disclosure, the regional access device determines whether the message that needs to be transmitted contains M pieces of QoS information (i.e., service quality QoS information). When it is determined that the device identifier in the first piece of QoS information is consistent with the device identifier of the regional access device, the QoS value of the message that needs to be transmitted is updated to the first QoS value in the first piece of QoS information, and the updated message that needs to be transmitted is forwarded. The M pieces of QoS information are generated according to the QoS values set by the regional access devices in each area for the message that needs to be transmitted. The first piece of QoS information is any one of the M pieces of QoS information. By adding corresponding configuration to the message that needs to be transmitted, that is, inserting the M pieces of QoS information into the message that needs to be transmitted, the QoS value in different network regions can be updated without adding any configuration to the regional access device. Thus, the QoS value in different network areas can be automatically updated, and the workload brought by modifying the QoS value in different network areas can be reduced, thereby facilitating convenience of maintenance.

Figure 10:
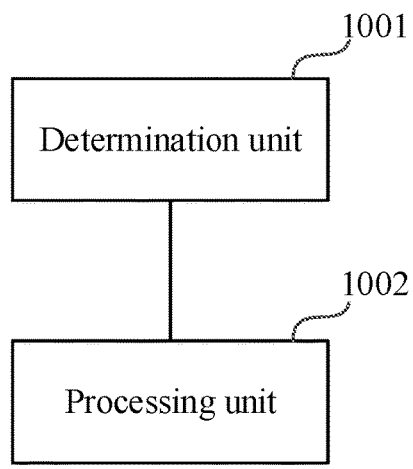
FIG. 10 is a schematic structural diagram of an exemplary data transmission apparatus according to some embodiments of the present disclosure.

Based on the same technical concept, FIG. 10 is a schematic structural diagram of an exemplary data transmission apparatus according to some embodiments of the present disclosure. The data transmission apparatus may execute the disclosed data transmission method.

As shown in FIG. 10, the data transmission apparatus includes a determination unit 1001 and a processing unit 1002.

The determining unit 1001 is configured to determine whether the message that needs to be transmitted contains M pieces of service quality QoS information. The M pieces of QoS information are generated according to the QoS values set by each regional access device for the message that needs to be transmitted. M is an integer greater than 1.

The processing unit 1002 is configured to update the QoS value of the message that needs to be transmitted to the first QoS value in the first piece of QoS information when it is determined that the device identifier in the first piece of QoS information is consistent with the device identifier of the area access device, and to forward the updated message that needs to be transmitted. The first piece of QoS information is any one of the M pieces of QoS information.

In some embodiments, the determining unit 1001 is further configured to:

determine the message to be transmitted contains M pieces of QoS information if it is determined that a preset field in the basic header of the message that needs to be transmitted is set with a set identifier, where the M pieces of QoS information are located in the extension header of the message that needs to be transmitted.

In some embodiments, the determining unit 1001 is further configured to:

determine the M pieces of QoS information that are set according to an order of the regional access devices that the message that needs to be transmitted traverses in series in the process of transmitting the message, and determine each piece of QoS information that includes the device identifier of the corresponding regional access device and the QoS value set by the corresponding regional access device.

In some embodiments, the processing unit 1002 is further configured to:

determine the first piece of QoS information located in the extended header of the message that needs to be transmitted; and determine that the device identifier in the first piece of QoS information is consistent with the device identifier of the regional access device.

In some embodiments, the processing unit 1002 is further configured to:

after the QoS value of the message that needs to be transmitted is updated to the first QoS value in the first piece of QoS information, delete the first piece of QoS information from the extension header.

In some embodiments, the processing unit 1002 is further configured to:

before updating the QoS value of the message that needs to be transmitted to the first QoS value in the first piece of QoS information, set the validity flag bit in the first piece of QoS information to valid.

The processing unit 1002 is further configured to:

delete the piece of QoS information whose validity flag is valid.

Figure 11:
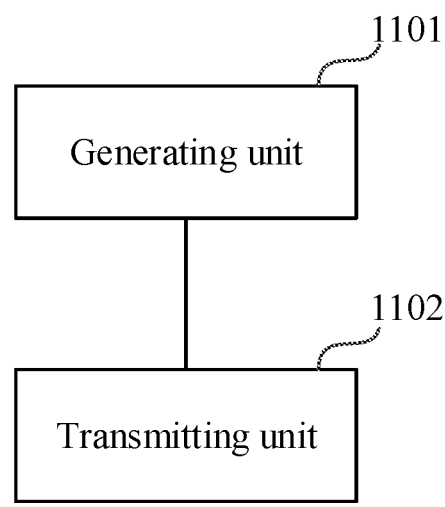
FIG. 11 is a schematic structural diagram of another exemplary data transmission apparatus according to some embodiments of the present disclosure.

Based on the same technical concept, FIG. 11 is a schematic structural diagram of another exemplary data transmission apparatus according to some embodiments of the present disclosure, and the data transmission apparatus can execute the process of the disclosed data transmission method.

As shown in FIG. 11, the data transmission apparatus includes a generating unit 1101 and a transmitting unit 1102.

The generating unit 1101 is configured to generate a message that needs to be transmitted, which includes M pieces of service quality QoS information. The M pieces of QoS information are generated according to the QoS value set for the message that needs to be transmitted by each regional access device. M is an integer greater than 1.

The transmitting unit 1102 is configured to transmit the message that needs to be transmitted.

In some embodiments, the generating unit 1101 is further configured to:

generate the initial message that needs to be transmitted by the service device;

determine a message modification rule of the initial message according to the service type of the initial message, where each message modification rule corresponds to at least one piece of QoS information; and add the M pieces of QoS information to the extension header of the initial message according to the message modification rule, and set the set flag in the preset field of the basic header of the initial message to obtain the message that needs to be transmitted.

In some embodiments, the generating unit 1101 is further configured to:

generate the message modification rule by the control terminal based on the service type set by the service device, where the messages of the same service type are transmitted through the same regional access device, and the pieces of QoS information set for the messages of the same service type by the same regional access device are the same.

Figure 12:
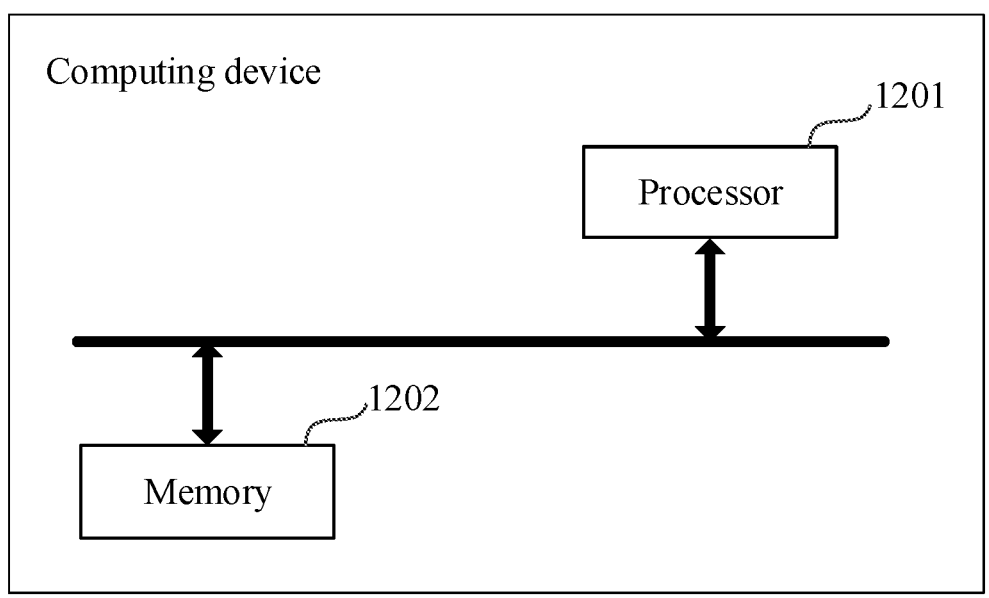
FIG. 12 is a schematic structural diagram of an exemplary computing device according to some embodiments of the present disclosure.

Based on the same technical concept, FIG. 12 is a schematic structural diagram of an exemplary computing device according to some embodiments of the present disclosure. As shown in FIG. 12, the computing device includes at least one processor 1201 and a memory 1202 connected to the at least one processor 1201. In the embodiments of the present disclosure, a connection medium between the at least one processor 1201 and the memory 1202 is specified. For illustration purpose, as shown in FIG. 12, the at least one processor 1201 and the memory 1202 are connected through a bus. The bus may include an address bus, a data bus, and a control bus, etc.

In some embodiments, the memory 1202 stores instructions that can be executed by the at least one processor 1201, and the at least one processor 1201 can execute the steps included in the foregoing data transmission method by executing the instructions stored in the memory 1202.

In some embodiments, the at least one processor 1201 is a control center of the computing device, uses various interfaces and circuits to connect various parts of the computing device, and processes data through running or executing the instructions stored in the memory 1202 and accessing the data stored in the memory 1202. In some embodiments, the at least one processor 1201 may include one or more processing units, and the at least one processor 1201 may integrate an application processor and a modem processor. The application processor processes an operating system, a user interface, and application programs, etc. The modem processor processes to transmit instructions. It should be understood that, the above-mentioned modem processor may not be integrated into the at least one processor 1201. In some embodiments, the at least one processor 1201 and the memory 1202 may be implemented on a same chip. In some other embodiments, the at least one processor 1201 and the memory 1202 may be implemented separately on separate chips.

The at least one processor 1201 may be a general-purpose processor, such as a central processing unit (CPU), a digital signal processor, an application specific integrated circuit (ASIC), a field programmable gate array (FPGA) or other programmable logic device (PLD), logic devices including discrete gates or transistors, and discrete hardware components to implement or execute the methods, steps, and logic block diagrams disclosed in the embodiments of the present disclosure. The general-purpose processor may be a microprocessor or any conventional processor or the like. The steps of the methods disclosed in conjunction with the data transmission embodiments can be executed directly by a hardware processor, or executed by a combination of hardware and software modules in the processor.

The memory 1202, as a non-volatile computer-readable storage medium, can be used to store non-volatile software programs, non-volatile computer-executable programs and modules. The memory 1202 may include at least one type of storage medium, for example, may include flash memory, hard disk, multimedia card, card-type memory, random-access memory (RAM), static random-access memory (SRAM), programmable read-only memory (PROM), read-only memory (ROM), electrically erasable programmable read-only memory (EEPROM), magnetic memory, disk, CD, etc. The memory 1202 is, but is not limited to, any other medium that can be used to carry or store desired program code in the form of instructions or data structures and that can be accessed by a computer. In some embodiments, the memory 1202 may also be a circuit or any other device capable of implementing a storage function, for storing program instructions and/or data.

Based on the same technical concept, the embodiment of the present disclosure also provides a computer-readable storage medium, which stores a computer program executable by a computing device. When the computer program runs on the computing device, the computer program causes the computing device to perform the steps of the above data transmission method.

As appreciated by one skilled in the art, the embodiments of the present disclosure may be provided as a method, a system, or a computer program product. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable storage media (including, but not limited to, disk storage, CD-ROM, optical storage, etc.) having computer-usable program code embodied therein.

The present disclosure is described with reference to flowchart illustrations and/or block diagrams of methods, apparatus (systems), and computer program products according to the disclosure. It should be understood that each flow and/or block in the flowchart illustrations and/or block diagrams, and combinations of flows and/or blocks in the flowchart illustrations and/or block diagrams, can be implemented by computer program instructions. These computer program instructions may be provided to the processor of a general-purpose computer, a special purpose computer, an embedded processor, or other programmable data processing device to produce a machine such that the instructions executed by the processor of the computer or other programmable data processing device produce an apparatus for implementing the functions specified in a flow or flows of a flowchart and/or a block or blocks of a block diagram.

The computer program instructions may also be stored in a computer-readable memory capable of directing a computer or other programmable data processing apparatus to function in a particular manner, such that the instructions stored in the computer-readable memory result in an article of manufacture comprising instruction means, the instructions The apparatus implements the functions specified in the flow or flow of the flowcharts and/or the block or blocks of the block diagrams.

These computer program instructions can also be loaded on a computer or other programmable data processing device to cause a series of operational steps to be performed on the computer or other programmable device to produce a computer-implemented process such that the instructions provide steps for implementing the functions specified in the flow or flows of the flowcharts and/or the block or blocks of the block diagrams.

Although the embodiments of the present disclosure have been described, additional changes and modifications to these embodiments may occur to those skilled in the art once the basic inventive concepts are known. Therefore, the appended claims are intended to be construed to include the embodiments and all changes and modifications that fall within the scope of the present disclosure.

It will be apparent to those skilled in the art that various modifications and variations can be made in the present disclosure without departing from the spirit and scope of the disclosure. Thus, if these modifications and variations of the present disclosure fall within the scope of the claims of the present application and their equivalents, the present disclosure is also intended to include these modifications and variations.

What is claimed is:

1. A data transmission method, comprising:
    determining, by a regional access device, a message that needs to be transmitted includes M pieces of QoS information, wherein the M pieces of QoS information are generated according to QoS values set by each regional access device for the message that needs to be transmitted, the M pieces of QoS information are located in an extension header of the message that needs to be transmitted, and M is an integer greater than 1; and
    after the regional access device determines that a device identifier in a first piece of QoS information is consistent with a device identifier of the regional access device, updating a QoS value of the message that needs to be transmitted with a first QoS value in the first piece of QoS information, and forwarding the updated message that needs to be transmitted, wherein the first piece of QoS information is any one of the M pieces of QoS information.

2. The method according to claim 1, wherein determining the message that needs to be transmitted includes the M pieces of QoS information includes:
    determining, by the regional access device, the message that needs to be transmitted includes the M pieces of QoS information when a preset field in a basic header of the message that needs to be transmitted includes a set identifier.

3. The method according to claim 2, wherein:
    the M pieces of QoS information are set according to an order of regional access devices that the message that needs to be transmitted traverses in series in a process of transmitting the message, and each piece of QoS information includes a device identifier of the corresponding regional access device and a QoS value set by the corresponding regional access device.

4. The method according to claim 3, wherein determining that the device identifier in the first piece of QoS information is consistent with the device identifier of the regional access device includes:
    determining, by the regional access device, the first piece of QoS information located in the extension header of the message that needs to be transmitted; and
    determining, by the regional access device, that the device identifier in the first piece of QoS information is consistent with the device identifier of the regional access device.

5. The method according to claim 4, wherein after updating the QoS value of the message that needs to be transmitted to the first QoS value in the first piece of QoS information, the method further comprising:
    deleting, by the regional access device, the first piece of QoS information from the extension header.

6. The method according to claim 5, wherein before updating the QoS value of the message that needs to be transmitted to the first QoS value in the first piece of QoS information, the method further comprising:
  setting a validity flag bit in the first piece of QoS information to valid, wherein deleting, by the regional access device, the first piece of QoS information from the extension header includes deleting, by the regional access device, the piece of QoS information having the validity flag bit set to valid from the extension header.

7. A computing device, comprising:
  at least one processor; and
  at least one memory, wherein the at least one memory stores a computer program, and when being executed by the at least one processor, the computer program causes the at least one processor to perform a data transmission method, wherein the at least one processor is configured to:
    determine, by a regional access device, a message that needs to be transmitted includes M pieces of QoS information, wherein the M pieces of QoS information are generated according to QoS values set by each regional access device for the message that needs to be transmitted, the M pieces of QoS information are located in an extension header of the message that needs to be transmitted, and M is an integer greater than 1; and
    after the regional access device determines that a device identifier in a first piece of QoS information is consistent with a device identifier of the regional access device, update a QoS value of the message that needs to be transmitted with a first QoS value in the first piece of QoS information, and forward the updated message that needs to be transmitted, wherein the first piece of QoS information is any one of the M pieces of QoS information.

8. The device according to claim 7, wherein the at least one processor is further configured to:
  determine, by the regional access device, the message that needs to be transmitted includes the M pieces of QoS information when a preset field in a basic header of the message that needs to be transmitted includes a set identifier.

9. The device according to claim 8, wherein:
  the M pieces of QoS information are set according to an order of regional access devices that the message that needs to be transmitted traverses in series in a process of transmitting the message, and each piece of QoS information includes a device identifier of the corresponding regional access device and a QoS value set by the corresponding regional access device.

10. The device according to claim 9, wherein the processor is further configured to:
  determine, by the regional access device, the first piece of QoS information located in the extension header of the message that needs to be transmitted; and
  determine, by the regional access device, that the device identifier in the first piece of QoS information is consistent with the device identifier of the regional access device.

11. The device according to claim 10, wherein after updating the QoS value of the message that needs to be transmitted to the first QoS value in the first piece of QoS information, the processor is further configured to:
  delete the first piece of QoS information from the extension header.

12. The device according to claim 11, wherein before updating the QoS value of the message that needs to be transmitted to the first QoS value in the first piece of QoS information, the processor is further configured to:
  set a validity flag bit in the first piece of QoS information to valid, wherein deleting the first piece of QoS information from the extension header includes deleting the piece of QoS information having the validity flag bit set to valid from the extension header.

13. A non-transitory computer-readable storage medium, storing a computer program executable by a regional access device, and when the computer program runs on the regional access device, the computer program causes the regional access device to perform:
  determining a message that needs to be transmitted includes M pieces of QoS information, wherein the M pieces of QoS information are generated according to QoS values set by each regional access device for the message that needs to be transmitted, the M pieces of QoS information are located in an extension header of the message that needs to be transmitted, and M is an integer greater than 1; and
  after the regional access device determines that a device identifier in a first piece of QoS information is consistent with a device identifier of the regional access device, updating a QoS value of the message that needs to be transmitted with a first QoS value in the first piece of QoS information, and forwarding the updated message that needs to be transmitted, wherein the first piece of QoS information is any one of the M pieces of QoS information.

14. The storage medium according to claim 13, wherein determining the message that needs to be transmitted includes the M pieces of QoS information includes:
  determining, by the regional access device, the message that needs to be transmitted includes the M pieces of QoS information when a preset field in a basic header of the message that needs to be transmitted includes a set identifier.

15. The storage medium according to claim 14, wherein:
  the M pieces of QoS information are set according to an order of regional access devices that the message that needs to be transmitted traverses in series in a process of transmitting the message, and each piece of QoS information includes a device identifier of the corresponding regional access device and a QoS value set by the corresponding regional access device.

16. The storage medium according to claim 15, wherein determining that the device identifier in the first piece of QoS information is consistent with the device identifier of the regional access device includes:
  determining, by the regional access device, the first piece of QoS information located in the extension header of the message that needs to be transmitted; and
  determining, by the regional access device, that the device identifier in the first piece of QoS information is consistent with the device identifier of the regional access device.

17. The storage medium according to claim 16, wherein after updating the QoS value of the message that needs to be transmitted to the first QoS value in the first piece of QoS information, the method further comprising:
  deleting, by the regional access device, the first piece of QoS information from the extension header.

18. The storage medium according to claim 17, wherein before updating the QoS value of the message that needs to be transmitted to the first QoS value in the first piece of QoS information, the method further comprising:

setting a validity flag bit in the first piece of QoS information to valid, wherein deleting, by the regional access device, the first piece of QoS information from the extension header includes deleting, by the regional access device, the piece of QoS information having the validity flag bit set to valid from the extension header.

* * * * *